United States Patent
Chen et al.

(10) Patent No.: US 12,531,634 B2
(45) Date of Patent: Jan. 20, 2026

(54) OPTICAL TUNNEL NETWORK SYSTEM AND FAULT DIAGNOSIS METHOD FOR THE SAME

(71) Applicant: DELTA ELECTRONICS, INC., Taoyuan (TW)

(72) Inventors: Chun-Ting Chen, Taoyuan (TW); Maria Chi-Jui Yuang, Taoyuan (TW); Po-Lung Tien, Taoyuan (TW); Shao-Chun Wen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 274 days.

(21) Appl. No.: 18/545,094

(22) Filed: Dec. 19, 2023

(65) Prior Publication Data

US 2025/0080218 A1 Mar. 6, 2025

(30) Foreign Application Priority Data

Sep. 6, 2023 (CN) .......................... 202311145815.4

(51) Int. Cl.
*H04B 10/00* (2013.01)
*H04B 10/077* (2013.01)
*H04J 14/00* (2006.01)

(52) U.S. Cl.
CPC ..... *H04B 10/0771* (2013.01); *H04B 10/0773* (2013.01)

(58) Field of Classification Search
CPC .... H04B 10/07; H04B 10/075; H04B 10/079; H04B 10/0791; H04B 10/0793
See application file for complete search history.

(56) References Cited

U.S. PATENT DOCUMENTS

| | | | | |
|---|---|---|---|---|
| 9,806,801 | B2 * | 10/2017 | Maniloff | .............. H04B 10/038 |
| 12,160,262 | B1 * | 12/2024 | Valdez | ............... H04B 10/0771 |
| 2014/0099099 | A1 | 4/2014 | Dupuis et al. | |
| 2021/0376923 | A1 * | 12/2021 | Swinkels | ........... H04Q 11/0066 |

FOREIGN PATENT DOCUMENTS

| | | |
|---|---|---|
| CN | 111836136 A | 10/2020 |
| CN | 116707634 A | 9/2023 |
| TW | 200814566 A | 3/2008 |
| TW | I814662 B | 9/2023 |

OTHER PUBLICATIONS

Office Action dated Feb. 20, 2024 of the corresponding Taiwan patent application No. 112133815.

* cited by examiner

*Primary Examiner* — Daniel G Dobson
(74) *Attorney, Agent, or Firm* — MUNCY, GEISSLER, OLDS & LOWE, P.C.

(57) ABSTRACT

A fault diagnosis method applied to an optical tunnel network system (OPTUNS) having multiple optical switches and multiple optical fibers connected to the multiple optical switches is disclosed and includes following steps: detecting whether the multiple tunnels of the OPTUNS include a faulty tunnel, where each tunnel respectively passes through multiple component parts; when the faulty tunnel is detected, querying the multiple component parts that are passed through by the tunnels within a certain range with the faulty tunnel; respectively calculating a faulty count of each component part queried, where the faulty count indicates the quantity that the component parts being passed through by the faulty tunnels; and outputting one or more of the component parts that have the faulty count of non-zero.

16 Claims, 10 Drawing Sheets

OPTICAL TUNNEL NETWORK SYSTEM AND FAULT DIAGNOSIS METHOD FOR THE SAME

BACKGROUND OF THE DISCLOSURE

Technical Field

The disclosure relates to an optical tunnel network system, which is particularly to a fault diagnosis method for the optical tunnel network system, and an optical tunnel network system using the fault diagnosis method.

Description of Related Art

An optical-tunnel-network system (OPTUNS) is composed of multiple optical switches, where these optical switches include first-class optical switches (e.g., OADS) in a tier 1 and second-class optical switches (e.g., OADS) in a tier 2. These optical switches are connected to each other through optical fibers, and each optical switch includes numerous optical components.

When any optical fiber in the OPTUNS or any optical component in any optical switch fails, a related tunnel will not operate normally, resulting in a faulty tunnel. That is, the tunnel has an abnormality and cannot transmit data correctly.

Unlike ordinary electronic components, the OPTUNS currently uses a software algorithm to detect whether the optical components get failed. The advantage of using the software algorithm is that no additional hardware components are required, thereby reducing system design costs. However, when an optical faulty tunnel exists in the OPTUNS, the system will not be able to quickly and accurately identify a range or an actual position of a faulty optical fiber or a faulty optical component, which will cause great inconvenience in system maintenance.

SUMMARY OF THE DISCLOSURE

A main purpose of the present disclosure is to provide an optical tunnel network system and a fault diagnosis method for the same, which can narrow a possible range of a faulty part or directly find the faulty part when an abnormality occurs in the optical tunnel.

In one of the exemplary embodiments, the fault diagnosis method of the present disclosure is incorporated with an optical tunnel network system, which includes multiple optical switches and multiple optical fibers connected to the multiple optical switches, and the fault diagnosis method includes following steps:
  a) detecting whether multiple tunnels of the optical tunnel network system include a faulty tunnel causing data loss, wherein each of the multiple tunnels respectively passes through multiple component parts;
  b) when one or more faulty tunnels are detected, querying the multiple component parts that are passed through by the tunnels within a certain range with the one or more faulty tunnels;
  c) respectively calculating a faulty count of each of the multiple component parts queried, wherein the faulty count indicates a quantity that each of the multiple component parts being passed through by the one or more faulty tunnels; and
  d) after the step c), outputting one or more of the component parts that have the faulty count of non-zero.

In one of the exemplary embodiments, the optical tunnel network system of the present disclosure includes:
  at least two optical switches, each respectively having multiple optical components;
  multiple optical fibers, connected to the at least two optical switches;
  multiple tunnels, respectively passing through multiple component parts, and configured for transmitting data in the at least two optical switches;
  a memory, recording each of the multiple tunnels and the component parts being passed through by the each of the multiple tunnels; and
  a central processing unit, configured for:
    when detecting that the multiple tunnels include one or more faulty tunnels causing data loss, referring to the memory to query the multiple component parts being passed through by the tunnels within a certain range with the one or more faulty tunnels,
    respectively calculating a faulty count of each of the component parts being passed through by the one or more faulty tunnels, and
    outputting one or more of the component parts that have the faulty count of non-zero.

Compared with related technologies, a technical effect which the present disclosure can achieve is to detect the faulty tunnel without using additional hardware components and to locate the faulty part, thereby significantly reducing the time and cost required for system maintenance.

DETAILED DESCRIPTION

In cooperation with the attached drawings, the technical contents and detailed description of the present disclosure are described hereinafter according to multiple embodiments, being not used to limit its executing scope. Any equivalent variation and modification made according to appended claims is all covered by the claims claimed by the present disclosure.

The present disclosure discloses an optical-tunnel-network system (OPTUNS) with a fault diagnosis function, which can detect a faulty tunnel that cannot correctly transmit data through software and narrow a possible range of a faulty part or directly locate a position of the faulty part in the optical tunnel network system.

Figure 1:
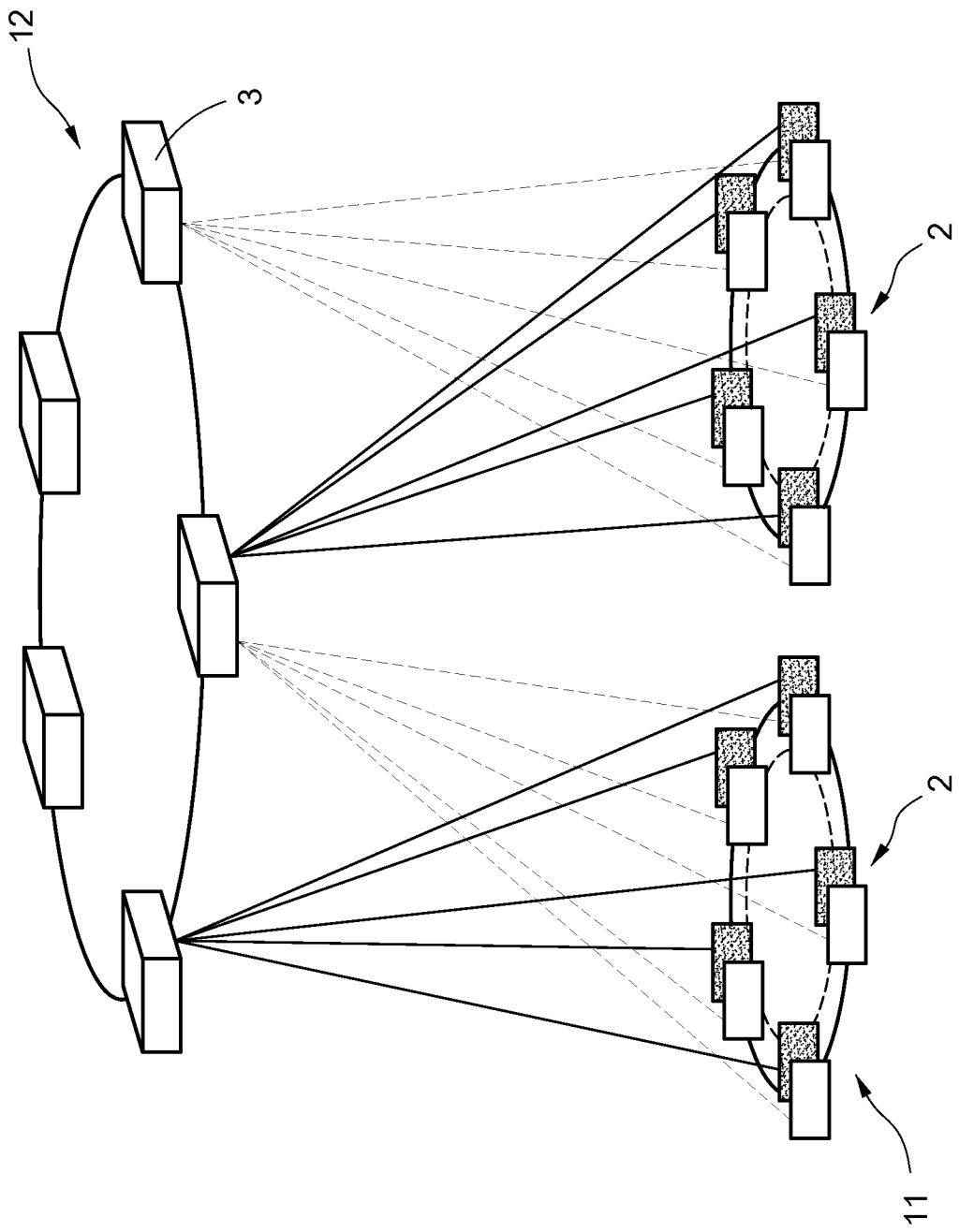
FIG. 1 is a system architecture diagram of an optical tunnel network system.

Please refer to FIG. 1, which is a system architecture diagram of an optical tunnel network system. As shown in FIG. 1, the optical tunnel network system can be divided into a tier1 11 and a tier2 12, where the tier1 11 is composed of multiple first-class optical switches 2 and the tier2 12 is composed of multiple second-class optical switches 3. In one embodiment, the first-class optical switch 2 can be implemented by OADS and the second-class optical switch 3 can be implemented by OSIS, but it is not limited thereto.

In the embodiment of FIG. 1, the tier1 11 is composed of five first-class optical switches 2 to form a POD, and the tier1 11 can include multiple PODs. As shown in FIG. 1, a first-class optical switch 2 can include two optical switches logically completely separated in a housing. Therefore, each five first-class optical switches 2 can form one POD (i.e., a solid circle and a dotted circle in FIG. 1 represent two separated PODs) that do not interfere with each other.

As shown in FIG. 1, each first-class optical switch 2 in same POD is connected to each other through optical fibers respectively. Each second-class optical switch 3 is also connected to each other through the optical fibers to form the mesh network. The first-class optical switch 2 of each POD is connected to the same second-class optical switch 3 through the optical fibers. In this way, the optical tunnel network system can use the second-class optical switches 3 of the tier2 12 to connect to the first-class optical switches 2 of multiple PODs of the tier1 11 in series.

In the present disclosure, each optical switch (including the first-class optical switch 2 and the second-class optical switch 3) has multiple optical components inside, and the optical tunnel network system is set to form multiple optical tunnels for data transmission by using the multiple optical components and the multiple optical fibers. A technical feature of the present disclosure is that when one of the tunnels causes data loss due to faulty, the optical tunnel network system can either detect the possible range of the faulty part through software or directly locate the position of the faulty part.

Figure 2:
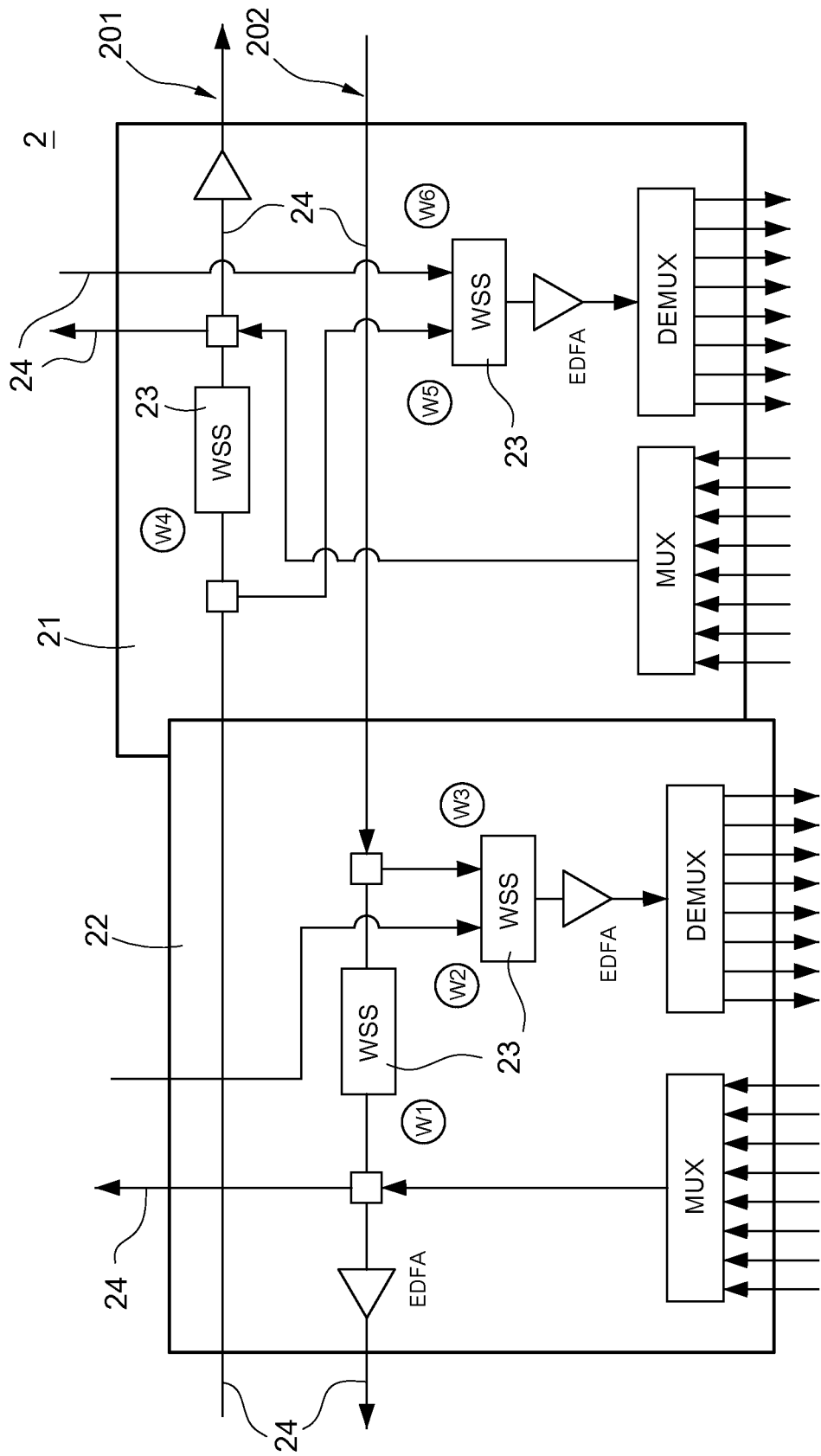
FIG. 2 is a specific implementation example of a block diagram of a first-class optical switch of the present disclosure.
Figure 3:
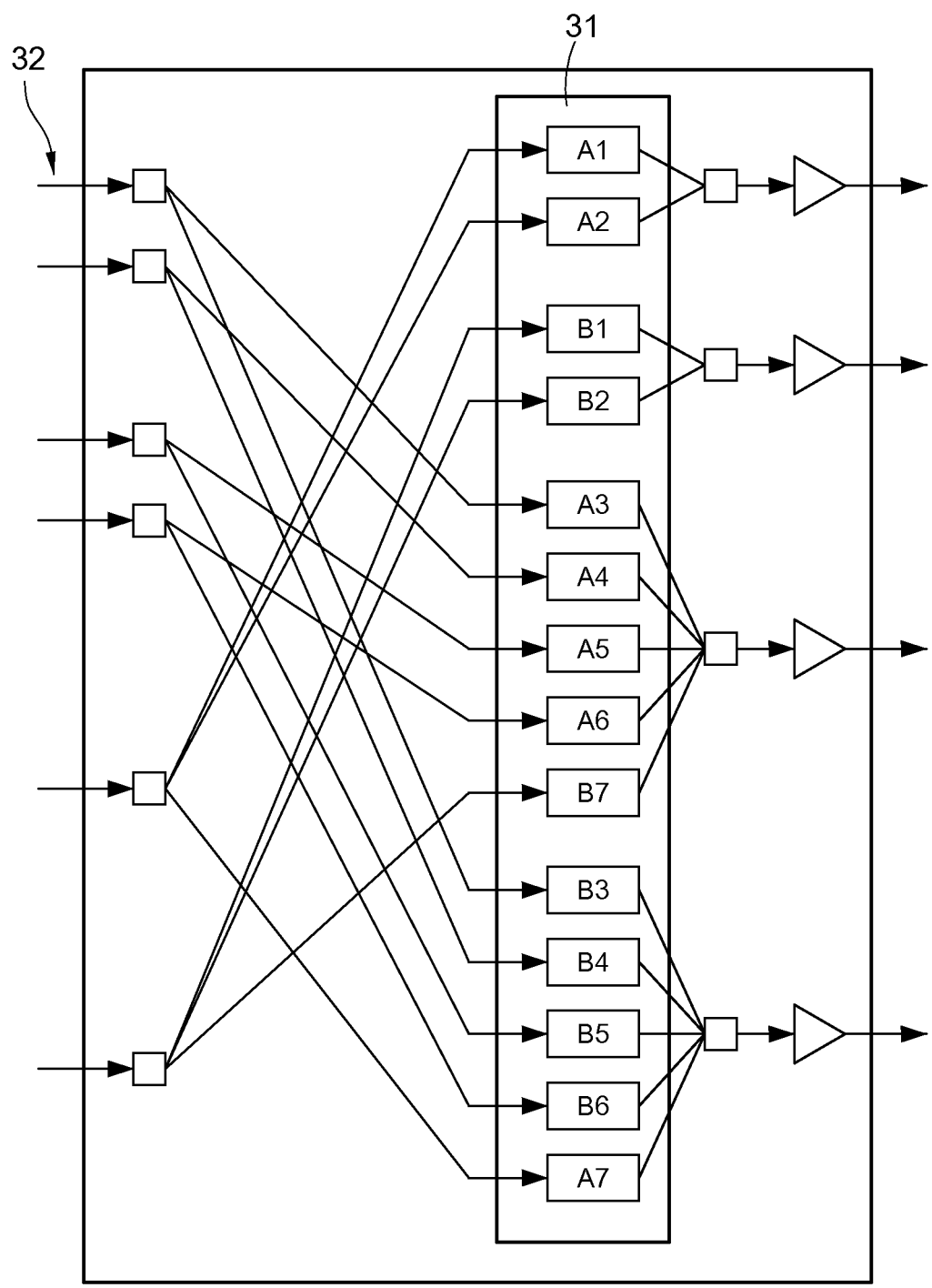
FIG. 3 is a specific implementation example of a block diagram of a second-class optical switch of the present disclosure.

Please continue to refer to FIG. 2 and FIG. 3, where FIG. 2 is a specific implementation example of a block diagram of the first-class optical switch of the present disclosure and FIG. 3 is a specific implementation example of a block diagram of the second-class optical switch of the present disclosure.

As shown in FIG. 2, each first-class optical switch 2 includes a forward first-class optical switch 21 and a reverse first-class optical switch 22 that are separated logically in its housing. The forward first-class optical switch 21 and the reverse first-class optical switch 22 respectively have multiple optical components, including a wavelength selective switch (WSS) 23, a multiplexer (MUX), a demultiplexer (DEMUX), and an erbium-doped fiber amplifier (EDFA), etc., but are not limited. These optical components are connected to the optical components of other optical switches through one or more optical fibers 24 to form one or more tunnels.

In one embodiment, the forward first-class optical switch 21 is connected to an adjacent forward first-class optical switch 21 in the same POD through the optical fiber 24, thereby forming one or more forward transmission tunnels 201 in this POD. Similarly, the reverse first-class optical switch 21 is connected an adjacent reverse first-class optical switch 21 in the same POD through the optical fiber 24, thereby forming one or more reverse transmission tunnels 202 in this POD.

The wavelength selective switch 23 is connected to the optical fiber 24 to control the passing and the blocking of the light. It should be noted that the optical components such as the multiplexers, the demultiplexers, and the erbium-doped fiber amplifiers are passive optical components in the optical switches, and their failure rates are extremely low. In one embodiment, in order to improve diagnosis efficiency, even if a faulty tunnel is detected, the system is unnecessary to detect the multiplexers, the demultiplexers, the erbium-doped fiber amplifiers, or other passive optical components.

In the embodiment of FIG. 2, W1-W6 are multiple wavelength selective switches 23 respectively connected to the optical fibers 24, and these wavelength selective switches 23 can be implemented in an array inside the first-class optical switch 2. That is, the multiple wavelength selective switches 23 coexist in a single wavelength selective switch array.

As shown in FIG. 3, each second-class optical switch 3 includes at least two wavelength selective switch arrays 31, where a first wavelength selective switch array includes at least seven wavelength selective switches A1-A7, and a second wavelength selective switch array includes at least seven wavelength selective switches B1-B7. Like the first-class optical switches 2, each second-class optical switch 3 is connected to each other through one or more optical fibers 32 to form the mesh network, and each second-class optical switch 3 is connected to the first-class optical switches 2 of the tier1 11 through one or more optical fibers 32 to connect to the multiple PODs of the tier1 11 in series.

When any optical tunnel in the optical tunnel network system cannot correctly transmit data and becomes the faulty tunnel, the present disclosure can detect through software which optical component or optical fiber fails and causes a normal tunnel to become the faulty tunnel.

Figure 4A:
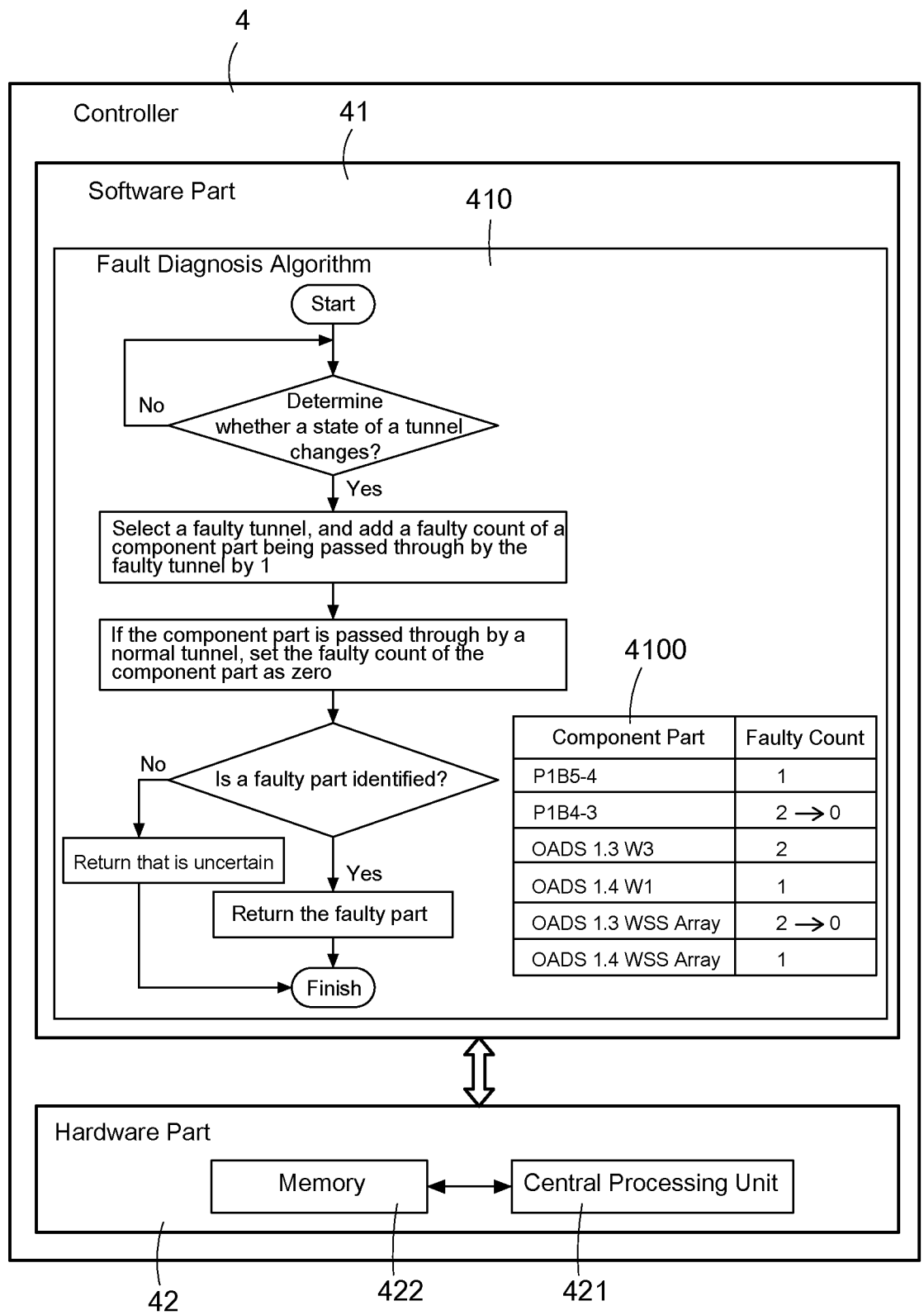
FIG. 4A is a first specific implementation example of a block diagram of the optical tunnel network system of the present disclosure.
Figure 4B:
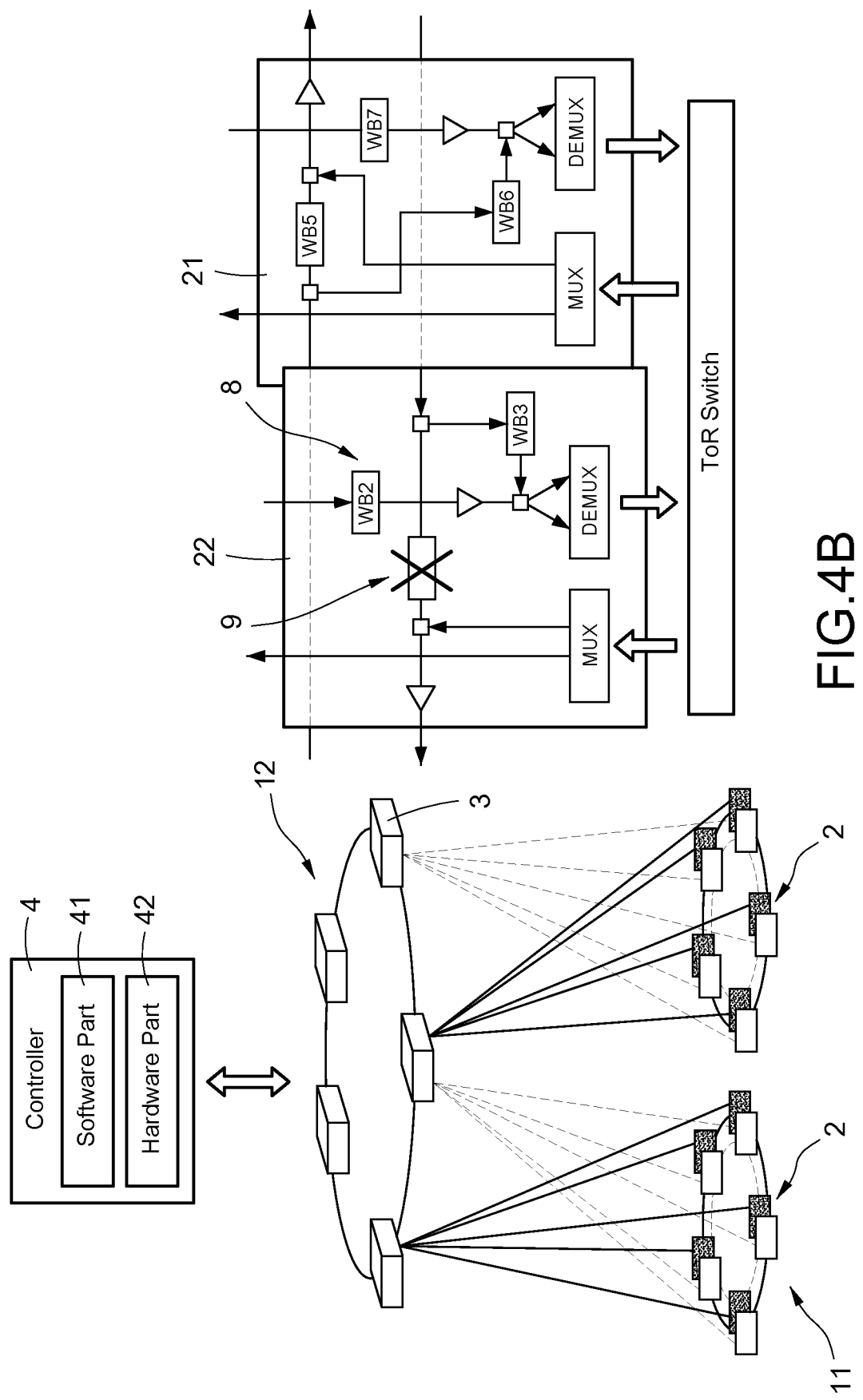
FIG. 4B is a second specific implementation example of a block diagram of the optical tunnel network system of the present disclosure.

Please continue to refer to FIG. 4A and FIG. 4B, which are respectively a first specific implementation example and a second specific implementation example of the block diagram of the optical tunnel network system of the present disclosure. As shown in FIG. 4A and FIG. 4B, the optical tunnel network system of the present disclosure includes two classes of the multiple optical switches (including first-class optical switches 2 and/or second-class optical switches 3) and a controller 4. In one embodiment, the controller 4 is a software-defined networking (SDN) controller.

The optical tunnel network system also includes the multiple optical fibers for connecting the multiple optical switches (including connecting two optical switches of the same class and connecting two optical switches of different classes). More specifically, each optical switch has the multiple optical components (e.g., the aforementioned WSS, MUX, DEMUX, etc.), and the multiple optical fibers connect to the optical components in each optical switch based on user settings to construct the multiple tunnels in the optical tunnel network system. In other words, each tunnel in the optical tunnel network system passes through multiple component parts 8 (including one of the multiple optical fibers and one of the multiple optical components), thereby transmitting data to at least two optical switches 2 and 3.

As shown in FIG. 4A, the controller 4 can be roughly divided into a software part 41 and a hardware part 42. Important components of the hardware part 42 include a central processing unit 421 and a memory 422 at least, where the central processing unit 421 is connected to the memory 422, the first-class optical switch 2, and the second-class optical switch 3 through wired or wireless methods. The central processing unit 421 is used for performing a fault diagnosis algorithm 410 of the present disclosure. The memory 422 is used for temporarily storing the fault diagnosis algorithm 410 and storing data and final results during a calculation process of the central processing unit 421.

The software part 41 of the controller 4 at least includes the fault diagnosis algorithm 410. In the present disclosure, the central processing unit 421 continuously performs the fault diagnosis algorithm 410 in the memory 422 to collect, monitor, and identify changes of all optical tunnels in the optical tunnel network system. Once a faulty tunnel is detected through calculation, the central processing unit 421 updates a faulty count of each component part 8 in a list 4100 created and stored in the memory 422. During the calculation process, the central processing unit 421 also resets the faulty count of one of the component parts 8 to be zero if the faulty count of the component part 8 is not zero but the component part 8 is passed through by other normal tunnels, thereby eliminating the misjudgment of the fault diagnosis algorithm 410.

As shown in FIG. 4A and FIG. 4B, the central processing unit 421 obtains one of the component parts 8 with a greatest faulty count from the updated list 4100 and regards this component part 8 as the faulty part 9 which is confirmed. It should be mentioned that if the faulty counts of more than two component parts 8 are the same, the central processing unit 421 can regard a result of this calculation process as an uncertain condition. That is, this calculation comparison cannot successfully detect the specific faulty part 9, so the central processing unit 421 will continue to detect in a next cycle.

In the present disclosure, the memory 422 records each tunnel in the optical tunnel network system and the component parts 8 being passed through by each tunnel. In one embodiment, the memory 422 stores a topological structure (not shown in the figure) which is pre-established, and the topological structure records positions and connection relationships of all component parts 8 (including the optical fibers and the optical components) in the optical tunnel network system. When the central processing unit 421 detects that any tunnel is a faulty tunnel when performing the fault diagnosis algorithm 410, the central processing unit 421 can query the topological structure to know which component parts 8 are passed through by the faulty tunnel, thereby narrowing the possible range of the faulty part 9 or directly locate the identity and the location of the faulty part 9.

In the present disclosure, the central processing unit 421 can detect whether the multiple tunnels of the optical tunnel network system include one or more faulty tunnels causing the data loss by performing the fault diagnosis algorithm 410.

The technical feature of the present disclosure is that when the central processing unit 421 detects the one or more faulty tunnels through the fault diagnosis algorithm 410, the central processing unit 421 can obtain all the component parts 8 being passed through by all the tunnels in a certain range by referring to the content of the memory 422 and respectively calculate the faulty count of each component part 8. In one embodiment, the central processing unit 421 updates one or more component parts 8 with the faulty counts which is non-zero in the list 4100 as a candidate list of the faulty part 9 which is possible. In the present disclosure, the faulty count indicates a quantity of each component part 8 being passed through by one or more faulty tunnels. For example, if the faulty count of a first WSS is 2, it means that the first WSS is passed through by two faulty tunnels; if the faulty count of a second optical fiber is 1, it means that the second optical fiber is passed through by one faulty tunnel, and so on.

Figure 5:
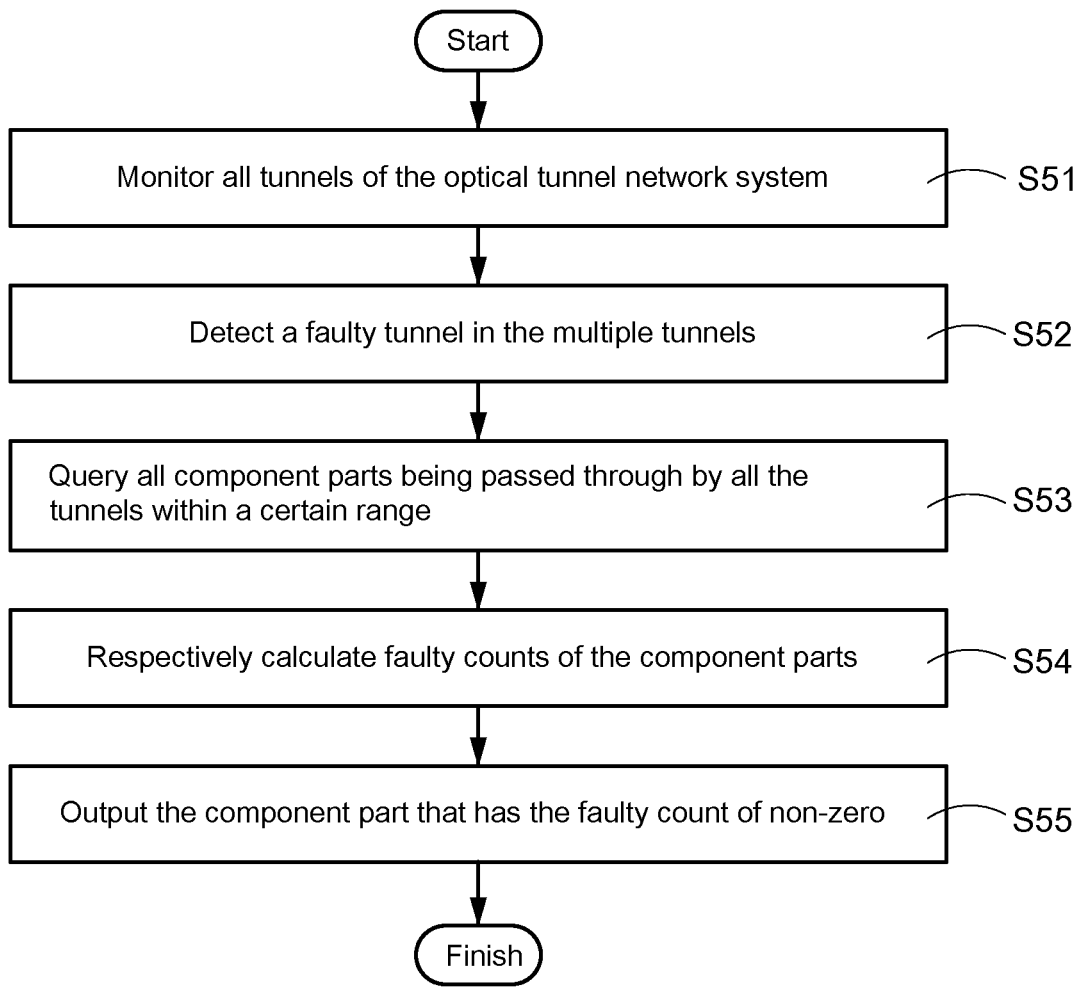
FIG. 5 is a first implementation example of a flowchart of a fault diagnosis method of the present disclosure.

Please also refer to FIG. 5, which is a first implementation example of a flowchart of the fault diagnosis method of the present disclosure. FIG. 5 discloses specific performing steps of the fault diagnosis method of the present disclosure, where the fault diagnosis method can be implemented by each component of the optical tunnel network system shown in FIGS. 1 to 4A and 4B.

As shown in FIG. 5, after the optical tunnel network system of the present disclosure is started, the central processing unit 421 continuously monitors all the tunnels which have been established in the optical tunnel network system (step S51) and detects whether the multiple tunnels include the faulty tunnel that causes data loss (step S52). As mentioned above, each tunnel in the optical tunnel network system is pre-defined and respectively passes through the multiple component parts. More particular, each tunnel respectively passes through one of the multiple optical fibers and at least one optical component in one of the multiple optical switches.

When the one or more faulty tunnels are detected, the central processing unit 421 queries all the component parts 8 being passed through by all the tunnels within a certain range with the one or more faulty tunnels being detected (step S53) and respectively calculates the faulty counts for these component parts 8 (step S54). As mentioned above, these faulty counts respectively indicate the quantities of one or more faulty tunnels that pass through each component part 8. The higher the faulty count, the higher possibility that the component part 8 is the faulty part 9 will be; the lesser the faulty count, the lower possibility that the component part 8 is the faulty part 9 will be. When the faulty count is zero, it means that the component part 8 is impossible to be the faulty part 9.

After step S54, the central processing unit 421 outputs all component parts 8 which the faulty count is non-zero (step S55).

In one embodiment, the central processing unit 421 can display the component part 8 which the faulty count is non-zero on a display screen (not shown) of the optical tunnel network system. In another embodiment, the central processing unit 421 can transmit the candidate list of the component parts 8, which the faulty counts are non-zero, to an external electronic device for notification and displaying. In this way, a user can focus on the one or more component parts 8 causing faulty to quickly and accurately maintain or replace the component parts 8.

Figure 6:
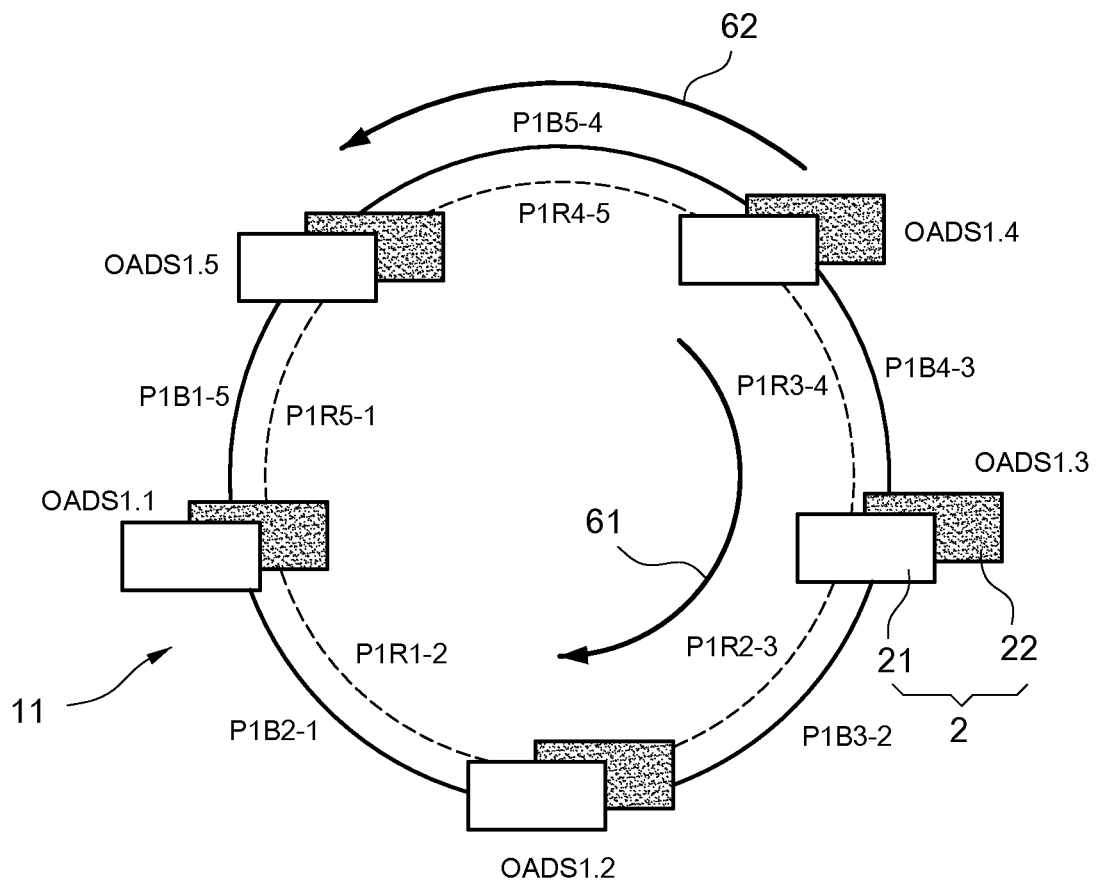
FIG. 6 is a first implementation example of a schematic diagram of a tunnel of the present disclosure.

Please continue to refer to FIG. 6, which is a first implementation example of a schematic diagram of the tunnel of the present disclosure. FIG. 6 takes the first-class optical switch 2 as an example to explain the tunnel of the present disclosure in detail.

As mentioned above, in order to list the candidate list of all component parts 8 related to the faulty tunnel when a faulty tunnel is detected, the present disclosure needs to encode all positions and connection relationships of each optical component and each optical fiber in each optical switch and records the information in the memory 422 (i.e., recorded as a topological structure). The encoding is presented as a practical example in FIG. 6.

FIG. 6 discloses one POD of the tier1 11. This POD is composed of five first-class optical switches 2, including OADS1.1, OADS1.2, OADS1.3, OADS1.4, and OADS1.5, where 1.1 indicates the first first-class optical switch in a first POD, 1.2 indicates the second first-class optical switch in the first POD, and so on.

As mentioned above, each first-class optical switch 2 includes the forward first-class optical switch 21 and the reverse first-class optical switch 22. Multiple forward first-class optical switches 21 of the same POD are connected in series through multiple optical fibers, including P1B5-4, P1B4-3, P1B3-2, P1B2-1, and P1B1-5, where the P1B5-4 indicates the optical fiber connecting a fifth forward first-class switch 21 to a fourth forward first-class switch 21 in the first POD, the P1B4-3 indicates the optical fiber connecting the fourth forward first-class switch 21 to a third forward first-class switch 21 in the first POD, and so on.

Similarly, multiple reverse first-class optical switches 22 of the same POD are connected in series through the multiple optical fibers, including P1R1-2, P1R2-3, P1R3-4, P1R4-5 and P1R5-1, where the P1R1-2 indicates the optical fiber connecting a first reverse first-class switch 21 to a second reverse first-class switch 21 in the first POD, the P1R2-3 indicates the optical fiber connecting the second reverse first-class switch 21 to a third reverse first-class switch 21 in the first POD, and so on.

In an embodiment of FIG. 6, the optical tunnel network system includes a first optical tunnel 61 and a second optical tunnel 62, where the first optical tunnel 61 is a forward tunnel and the second optical tunnel 62 is a reverse tunnel. As shown in FIG. 6, the first optical tunnel 61 connects three forward first-class optical switches OADS1.4, OADS1.3, and OADS1.2 through optical fibers P1B4-3, and P1B3-2, and the first optical tunnel 61 passes through multiple optical components (not shown in the figure) in these three forward first-class optical switches OADS1.4, OADS1.3, and OADS1.2. The second optical tunnel 62 connects two reverse first-class optical switches OADS1.4 and OADS1.5 through optical fiber P1R4-5, and the second optical tunnel 62 passes through multiple optical components (not shown in the figure) in these two reverse first-class optical switches OADS1.4 and OADS1.5.

When the central processing unit 421 detects that the first optical tunnel 61 is a faulty tunnel, the central processing unit 421 can list all the component parts 8 being passed through by the first optical tunnel 61 through the aforementioned encoding (e.g., querying the topological structure) and determine which component part 8 is a possible faulty part 9.

Similarly, when the central processing unit 421 detects that the second optical tunnel 62 is a faulty tunnel, the central processing unit 421 can list all the component parts 8 being passed through by the second optical tunnel 62 through the aforementioned encoding and determine which component part 8 is a possible faulty part 9.

Figure 7:
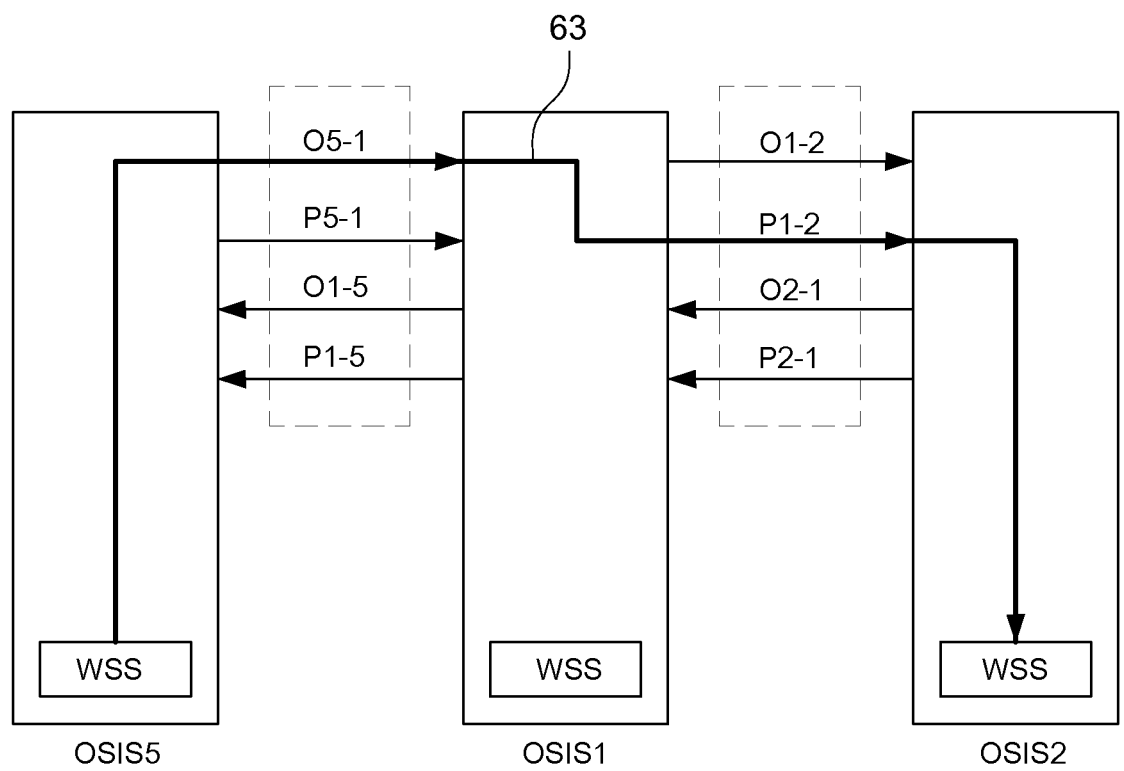
FIG. 7 is a second implementation example of a schematic diagram of the tunnel of the present disclosure.

Please also refer to FIG. 7, which is a second embodiment of a schematic diagram of the tunnel of the present disclosure. FIG. 7 takes the second-class optical switch 3 as an example to explain the tunnel of the present disclosure in detail.

As mentioned above, the present disclosure encodes all the positions and connection relationships of each optical component and each optical fiber in each optical switch and records them as the topological structure. In the present disclosure, the tier2 12 includes five second-class optical switches 3 connected in series at least, and the embodiment of FIG. 7 shows three second-class optical switches 3, including OSIS5, OSIS1, and OSIS2, where the OSIS5 indicates a fifth second-class optical switch in the tier2 12, the OSIS1 indicates the first second-class optical switch in the tier2 12, and the OSIS2 indicates the second second-class optical switch in tier2 12.

In the present disclosure, each second-class optical switch 3 is connected to an adjacent second-class optical switch 3 in series through two types of the optical fibers. In the embodiment of FIG. 7, the OSIS5 is connected to the OSIS1 through at least four optical fibers including O5-1, P5-1, O1-5, and P1-5, where the O5-1 indicates the optical fiber which transmits data originated from the OSIS5 from the OSIS5 to the OSIS1, the P5-1 indicates the optical fiber which transmits data passed through the OSIS5 from the OSIS5 to the OSIS1, the O1-5 indicates the optical fiber which transmits data originated from the OSIS1 from the OSIS1 to the OSIS5, and the P1-5 indicates the optical fiber which transmits data passed through the OSIS1 from the OSIS1 to the OSIS5.

For another example, the OSIS1 is connected to the OSIS2 through at least four optical fibers including O1-2, P1-2, O2-1 and P2-1, where the O1-2 indicates the optical fiber which transmits data originated from the OSIS1 from the OSIS1 to the OSIS2, the P1-2 indicates the optical fiber which transmits data passed through the OSIS1 from the OSIS1 to the OSIS2, the O2-1 indicates the optical fiber which transmits data originated from the OSIS2 from the OSIS2 to the OSIS1, and the P2-1 indicates the optical fiber which transmits data passed through the OSIS2 from the OSIS2 to the OSIS1.

In one embodiment, the multiple optical fibers between two second-class optical switches 3 can be integrated into a ribbon fiber (i.e., dotted boxes in the FIG. 7). In terms of hardware, the user uses the ribbon fiber with at least four optical fibers inside to connect two second-class optical switches 3. In this embodiment, when one optical fiber fails, the central processing unit 421 not only regards this optical fiber as a faulty part, but also regards the ribbon fiber covering the failed optical fiber as the faulty part (i.e., add 1 to the faulty count of the ribbon fiber), and this ribbon fiber is listed on the candidate list of the faulty parts.

In the embodiment of FIG. 7, the optical tunnel network system includes a third optical tunnel 63. As shown in FIG. 7, the third optical tunnel 63 connects the second-class optical switches OSIS5 and OSIS1 through the optical fiber O5-1 and connects the second-class optical switches OSIS1 and OSIS2 through the optical fiber P1-2. Moreover, the third optical tunnel 63 passes through the multiple optical components (not shown in the figure) in these three second-class optical switches OSIS5, OSIS1, and OSIS2, where the third optical tunnel 63 transmits data originated from the OSIS5 from the OSIS5 to the WSS of the OSIS2 through the OSIS1, and then transmits the data to the first-class optical switch 2 of the tier1 11 connected in series through the WSS of the OSIS2.

When the central processing unit 421 detects that the third optical tunnel 63 is a faulty tunnel, the central processing unit 421 can list all the component parts 8 being passed through by the third optical tunnel 63 through the aforementioned encoding and determine which component part 8 is probably the faulty part 9. It should be mentioned that, for ease of understanding, one or more first-class optical switches 2 of the tier1 11 connected to the OSIS 2 are not shown in FIG. 7. In one embodiment, if the third optical tunnel 63 is the faulty tunnel, the central processing unit 421 can list all the component parts 8 of the second-class optical switch 3 and all the component parts 9 of the first-class optical switch 2 being passed through by the third optical tunnel 63, and it is not limited to what is shown in FIG. 7.

Figure 8:
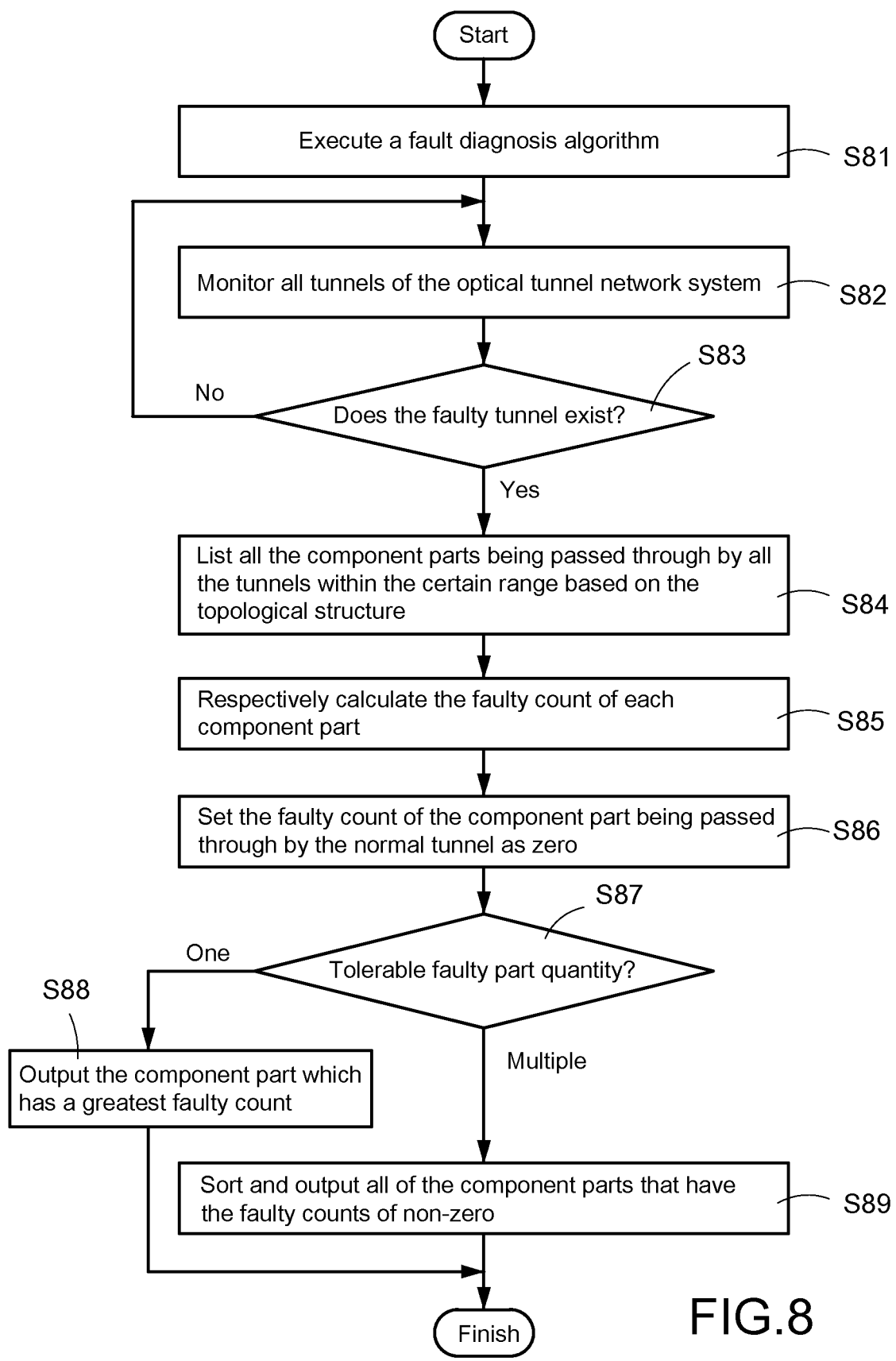
FIG. 8 is a second implementation example of a flowchart of the fault diagnosis method of the present disclosure.
Figure 9:
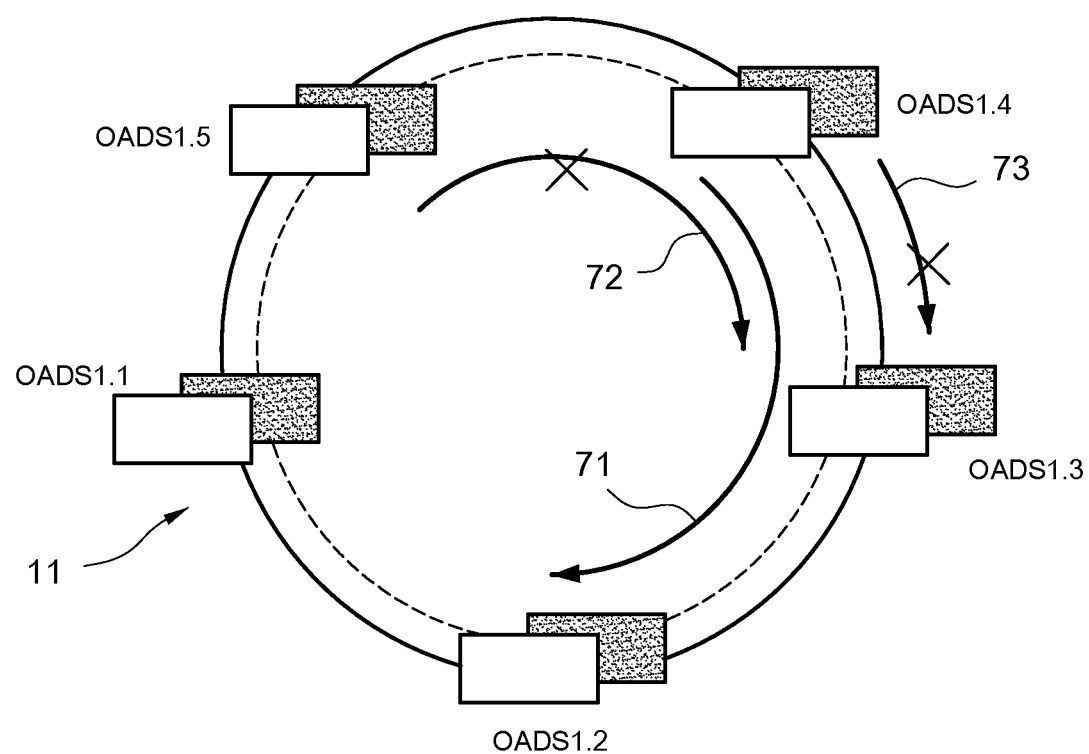
FIG. 9 is a third implementation example of a schematic diagram of the tunnel of the present disclosure.

Please continue to refer to FIG. 8 and FIG. 9, where FIG. 8 is a second implementation example of a flowchart of the fault diagnosis method of the present disclosure and FIG. 9 is a third implementation example of the tunnel of the present disclosure. Under the premise that the topological structure records the encoding of all component parts 8, a more detailed technical description of the fault diagnosis method of the present disclosure will be given below in conjunction with the embodiments of FIG. 8 and FIG. 9.

As shown in FIG. 8, first, after the optical tunnel network system is started, the controller 4 executes the fault diagnosis algorithm 410 (step S81) to continuously monitor all the tunnels in the optical tunnel network system (step S82) and continuously determine whether the faulty tunnel occurs (step S83). If no faulty tunnel is detected, the optical tunnel network system can continue to transmit data, and the central processing unit 421 continues to monitor these tunnels through the fault diagnosis algorithm 410.

In one embodiment, after the fault diagnosis algorithm 410 is executed, the receiving terminal and transmitting terminal in the multiple tunnels are continuously monitored. When the fault diagnosis algorithm 410 detects that the transmitting terminal of any tunnel transmits data but the receiving terminal of same tunnel does not receive the corresponding data, the fault diagnosis algorithm 410 can determine that this tunnel passes through at least one faulty part and become a faulty tunnel. In one embodiment, the fault diagnosis algorithm 410 determines that the tunnel is a faulty tunnel when detecting that a difference between a data amount of the receiving terminal and a data amount of the transmitting terminal of any tunnel is greater than a threshold value.

It should be mentioned that each tunnel in the optical tunnel network system respectively transmits data from a source optical switch (which can be the first-class optical switch 2 or the second-class optical switch 3) to a destination optical switch (which can be the first-class optical switch 2 or the second-class optical switch 3). In the above embodiment, the transmitting terminal of the tunnel can be an output port on the source optical switch and the receiving terminal of the tunnel can be an input port on the destination optical switch. However, the above is only a specific implementation example of the present disclosure, but is not limited thereto.

In the embodiment of FIG. 9, the optical tunnel network system includes a first optical tunnel 71 which transmits data from the OADS1.4 to the OADS1.2, a second optical tunnel 72 which transmits data from the OADS1.5 to the OADS1.3, and a third optical tunnel 73 which transmits data from the OADS1.4 to the OADS1.3. In one embodiment, the fault diagnosis algorithm 410 establishes a following table 1 after monitoring the three optical tunnels 71-73:

TABLE 1

| Tunnel | Transmitting terminal | Receiving terminal | Data flow of transmitting terminal | Data flow of receiving terminal | State |
|---|---|---|---|---|---|
| First optical tunnel | OADS1.4 Port1 | OADS1.2 Port1 | 1 Gbps | 1 Gbps | Normal |
| Second optical tunnel | OADS1.5 Port1 | OADS1.3 Port1 | 2 Gbps | 0 Gbps | Faulty |
| Third optical tunnel | OADS1.4 Port2 | OADS1.3 Port2 | 1 Gbps | 0 Gbps | Faulty |

Table 1 above shows that the data flow of the transmitting terminal is the same as the data flow of the receiving terminal data flow in the first optical tunnel 71. In other words, there is no data loss in the first optical tunnel 71. Therefore, the fault diagnosis algorithm 410 can determine that the first optical tunnel 71 belongs to the normal tunnel.

The data flow of the transmitting terminal (2 Gbps) is different from the data flow of the receiving terminal (0 Gbps) in the second optical tunnel 72, which means that the second optical tunnel 72 cannot correctly transmit data, so the fault diagnosis algorithm 410 identifies that the second optical tunnel 72 as the faulty tunnel. The data flow of the transmitting terminal (1 Gbps) is different from the data flow of the receiving terminal (0 Gbps) in the third optical tunnel 73, which means that the third optical tunnel 73 cannot correctly transmit data, so the fault diagnosis algorithm 410 identifies that the third optical tunnel 73 as the faulty tunnel.

Return to FIG. 8. If one or more faulty tunnels are detected in step S83, the central processing unit 421 reads the topological structure in the memory 422, and list all the component parts 8 being passed through by all the tunnels within the certain range based on the topological structure (step S84). Furthermore, the central processing unit 421 calculates the faulty count of each component part 8 being listed (step S85). In the present disclosure, the faulty count represents the quantity that each component part 8 being passed through by the one or more faulty tunnels.

In one embodiment, in step S84, the central processing unit 421 obtains all the tunnels in the same POD as the faulty tunnel based on the contents of the topological structure and lists all the component parts 8 being passed through by these tunnels.

In another embodiment, in step S84, the central processing unit 421 obtains all tunnels in same transmission direction (including forward or reverse) as the faulty tunnel based on the contents of the topological structure and lists all the component parts 8 being passed through by these tunnels.

It should be noted that, each tunnel is initiated at an initial component part of the plurality of component parts and ended at a terminal component part of the plurality of component parts. In one embodiment, the transmission direction of a tunnel means the direction from the initial component part of this tunnel to the terminal component part of this tunnel. In an embodiment, in step S84, the central processing unit 421 obtains all tunnels that have same initial component part and terminal component part as the faulty tunnel based on the contents of the topological architecture and lists all the component parts 8 being passed through by these tunnels.

In another embodiment, in step S84, the central processing unit 421 obtains all tunnels in the same POD as the faulty tunnel and having the same transmission direction as the faulty tunnel based on the contents of the topological architecture and lists all the component parts 8 being passed through by these tunnels.

In the embodiment of FIG. 9, the first optical tunnel 71 starts from the OADS1.4 and passes through the optical fiber P1B4-3, the W1 in the OADS1.3, the optical fiber P1B3-2, and the W3 in the OADS1.2 in sequence. The second optical tunnel 72 starts from the OADS1.5 and passes through the optical fiber P1B5-4, the W1 in the OADS1.4, the optical fiber P1B4-3, and the W3 in the OADS1.3 in sequence. The third optical tunnel 73 starts from the OADS1.4 and passes through the optical fiber P1B4-3 and the W1 in the OADS1.3 in sequence. In step S84, the central processing unit 421 lists all the component parts 8 being passed through by all tunnels having the aforementioned relationships with the faulty tunnel (taking the second optical tunnel 72 and the third optical tunnel 73 as an example). In step S85, the central processing unit 421 respectively calculates the faulty counts for these component parts 8 and generates the following Table 2:

TABLE 2

| Component part | Faulty count |
|---|---|
| P1B5-4 | 1 |
| P1B4-3 | 2 |
| P1B3-2 | 0 |
| W3 of OADS1.2 | 0 |
| W1 of OADS1.3 | 0 |
| W3 of OADS1.3 | 2 |
| W of 1OADS1.4 | 1 |
| WSS Array of OADS1.2 | 0 |
| WSS Array of OADS1.3 | 2 |
| WSS Array of OADS1.4 | 1 |

As shown in Table 2 above, the optical fiber P1B5-4 and the W1 of the OADS1.4 are passed through by the second optical tunnel 72, so the faulty count is 1; the fiber P1B4-3 and the W3 of the OADS1.3 are passed through by the second optical tunnel 72 and the third optical tunnel 73, so the faulty count is 2; the optical fiber P1B3-2, the W1 of the OADS1.2, and the W1 of the OADS1.3 are not passed through by any faulty tunnel (i.e., the second optical tunnel 72 and the third optical tunnel 73), so the faulty count is 0.

In addition, as mentioned above, the multiple WSSs in the same optical switch can be implemented with the same WSS array, where the WSS array of the OADS1.3 includes the W3 of the OADS1.3, so the faulty count is of the WSS array of the OADS1.3 is 2. The WSS array of the OADS1.4 includes W1 of the OADS1.4, so the faulty count of the WSS array of the OADS1.4 is 1.

By generating the aforementioned Table 2, the central processing unit 421 can count the possibility about each of the component parts 8 is a faulty component 9. In one embodiment, the central processing unit 421 directly outputs all component parts 8 which the faulty count is non-zero, thereby notifying the user about the candidate list of the faulty parts 9. In this way, the possible range of the faulty parts can be effectively narrowed down. Through the fault diagnosis method of the present disclosure, it is unnecessary for the user to manually inspect the entire optical tunnel network system or use additional tools to inspect the entire optical tunnel network system when the faulty tunnel occurs, thereby saving system maintenance time and costs.

Return to FIG. 8. In another embodiment, after step S85, the central processing unit 421 further performs a secondary diagnosis on all the component parts 8 which are listed. Specifically, the central processing unit 421 detects whether each of the listed component parts 8 is passed through by any normal tunnel of the multiple tunnels (e.g., the first optical tunnel 71 in FIG. 9). If any of the listed component part 8 is passed through by any normal tunnel of the multiple tunnels, the central processing unit 421 sets the faulty count of this component part 8 as zero (step S86). In the present disclosure, the normal tunnel also passes through the multiple component parts 8, and all the component parts 8 being passed through by this normal tunnel are impossible to be the faulty parts 9; if the faulty count of these component parts 8 is non-zero, it must be a statistical error. Therefore, the faulty count of these component parts 8 needs to be reset as zero to match the reality.

After step S86, the central processing unit 421 can update the upper table 2 to the following table 3:

TABLE 3

| Component part | Faulty count |
|---|---|
| P1B5-4 | 1 |
| P1B4-3 | 2→0 |
| P1B3-2 | 0 |
| W3 of OADS1.2 | 0 |
| W1 of OADS1.3 | 0 |
| W3 of OADS1.3 | 2 |
| W of 1OADS1.4 | 1 |
| WSS Array of OADS1.2 | 0 |
| WSS Array of OADS1.3 | 2→0 |
| WSS Array of OADS1.4 | 1 |

As shown in Table 3, since the optical fiber P1B4-3 is passed through by the first optical tunnel 71 which is normal, the central processing unit 421 sets the faulty count of the optical fiber P1B4-3 as zero. Since the W1 of the OADS1.3 is passed through by the first optical tunnel 71 which is normal and the WSS array of the OADS1.3 includes the W1 of the OADS1.3, the central processing unit 421 sets the faulty count of the WSS array of the OADS1.3 as zero.

After step S86, the central processing unit 421 determines that at least one of the optical fiber P1B5-4, the W3 of the OADS1.3, and the W1 of the OADS1.4 (including the WSS array of the OADS1.4) may be the faulty part. At this time, the central processing unit 421 can directly output the candidate list including these faulty parts, otherwise, the central processing unit 421 can further identify an output method based on setting values of the optical tunnel network system.

In the embodiment of FIG. 8, the central processing unit 421 identifies a tolerable faulty part quantity of the optical tunnel network system based on preset parameters (step S87). If the user limits the tolerable faulty part quantity of the system as only one, the central processing unit 421 outputs one of the component parts 8 which has a greatest faulty count (step S88). In the embodiment of FIG. 9, the central processing unit 421 outputs the W3 of the OADS1.3 with the faulty count of 2 as a candidate for the faulty part.

If the user limits the tolerable faulty part quantity of the system to be more than one, the central processing unit 421 sorts all the component parts 8 which the faulty counts are non-zero and outputs these component parts 8 as a list of the faulty parts 9 (step S89). In the embodiment of FIG. 9, the central processing unit 421 sequentially outputs the W3 of the OADS1.3 with the faulty count of 2, the optical fiber P1B5-4 with the faulty count of 1, the W1 of the OADS1.4 with the faulty count of 1, and the WSS array of the OADS1.4 with the faulty count of 1 as the candidate list of the faulty parts, where the higher the faulty count, the higher probability that the component part 8 is the faulty part will be. The central processing unit 421 can assist maintenance personnel in performing more efficient maintenance operations by sorting the component parts 8 with the faulty counts which are non-zero.

Through the optical tunnel network system and fault diagnosis method of the present disclosure, diagnosis is performed by only using a software method without the need for additional hardware components, and the possible range of the faulty parts is reduced (i.e., when the tolerable faulty part quantity is greater than one) or the position of the faulty part (i.e., when the tolerable faulty part quantity is one) is directly located, thereby saving system maintenance time and costs.

As the skilled person will appreciate, various changes and modifications can be made to the described embodiment. It is intended to include all such variations, modifications and equivalents which fall within the scope of the present disclosure, as defined in the accompanying claims.

What is claimed is:

1. A fault diagnosis method for an optical tunnel network system, applied to the optical tunnel network system, wherein the optical tunnel network system comprises a plurality of optical switches and a plurality of optical fibers connected to the plurality of optical switches, and the fault diagnosis method comprises:
   a) detecting whether a plurality of tunnels of the optical tunnel network system comprises a faulty tunnel causing data loss, wherein each of the plurality of tunnels respectively passes through a plurality of component parts;
   b) when one or more faulty tunnels are detected, querying the plurality of component parts that are passed through by the tunnels within a certain range with the one or more faulty tunnels;
   c) respectively calculating a faulty count of each of the plurality of component parts queried, wherein the faulty count indicates a quantity that each of the plurality of component parts being passed through by the one or more faulty tunnels; and
   d) after the step c), outputting one or more of the component parts that have the faulty count of non-zero.

2. The fault diagnosis method in claim 1, wherein each of the plurality of tunnels respectively passes through one of the pluralities of optical fibers and at least one optical component in one of the pluralities of optical switches.

3. The fault diagnosis method in claim 1, wherein the step a) comprises:
   continuously monitoring a transmitting terminal and a receiving terminal of each of the plurality of tunnels, and when a difference of data amount between the receiving terminal and the transmitting terminal is greater than a threshold value, determining that the tunnel is the faulty tunnel.

4. The fault diagnosis method in claim 1, wherein the range comprises all of the tunnels in same POD as the one or more faulty tunnels.

5. The fault diagnosis method in claim 1, wherein the range comprises the tunnels that have same transmission direction as the one or more faulty tunnels.

6. The fault diagnosis method in claim 1, wherein the range comprises the tunnels that have same initial component part and terminal component part as the one or more faulty tunnels.

7. The fault diagnosis method in claim 1, wherein the plurality of component parts in the range are pre-recorded in a topological structure, wherein the topological structure records positions and connection relationships of all of the component parts in the optical tunnel network system.

8. The fault diagnosis method in claim 1, wherein the fault diagnosis method further comprises a step c1) after the step c) and the step c1) comprises:
   when any of the component parts is passed through by any normal tunnel of the plurality of tunnels, setting the faulty count of the component part as zero.

9. The fault diagnosis method in claim 1, wherein the step d) comprises:
   d1) when a tolerable faulty part quantity is one, outputting the component part that has a greatest faulty count; and
   d2) when the tolerable faulty part quantity is more than one, outputting all of the component parts that have the faulty counts of non-zero.

10. An optical tunnel network system with a fault diagnosis function, comprising:
    at least two optical switches, each respectively having a plurality of optical components;
    a plurality of optical fibers, connected to the at least two optical switches;
    a plurality of tunnels, respectively passing through a plurality of component parts, and configured for transmitting data in the at least two optical switches;
    a memory, recording each of the plurality of tunnels and the component parts being passed through by each of the plurality of tunnels; and
    a central processing unit, configured for:
    when detecting that the plurality of tunnels comprises one or more faulty tunnels causing data loss, referring to the memory to query the plurality of component parts being passed through by the tunnels within a certain range with the one or more faulty tunnels,
    respectively calculating a faulty count of each of the component parts being passed through by the one or more faulty tunnels, and
    outputting one or more of the component parts that have the faulty count of non-zero.

11. The optical tunnel network system in claim 10, wherein each of the plurality of tunnels passes through one of the pluralities of optical fibers and one of the pluralities of optical components at least.

12. The optical tunnel network system in claim 10, wherein
    the central processing unit is configured for performing a fault diagnosis algorithm to continuously monitor a transmitting terminal and a receiving terminal of each of the plurality of tunnels, and when a difference of data amount between the receiving terminal and the transmitting terminal is greater than a threshold value, determining that the tunnel is the faulty tunnel;
    wherein, each of the plurality of tunnels is configured respectively for transmitting data from a source optical switch to a destination optical switch, the transmission terminal is an output port of the source optical switch, and the receiving terminal is an input port of the destination optical switch.

13. The optical tunnel network system in claim 10, wherein the range comprises all of the tunnels in same POD as the one or more faulty tunnels, all of the tunnels having same transmission direction as the one or more faulty tunnels, or all of the tunnels that have same initial component part and terminal component part as the one or more faulty tunnels.

14. The optical tunnel network system in claim 10, wherein the central processing unit is configured for:
    when detecting the one or more faulty tunnels, reading a topological structure in the memory to obtain the plurality of component parts in the range, wherein the topological structure records positions and connection relationships of all of the component parts in the optical tunnel network system.

15. The optical tunnel network system in claim 10, wherein the central processing unit is configured for:
    when any of the component parts is passed through by any normal tunnel of the plurality of tunnels, setting the faulty count of the component part as zero.

16. The optical tunnel network system in claim 10, wherein the central processing unit is configured for:
  when a tolerable faulty part quantity is one, outputting the component part that has a greatest faulty count, and
  when the tolerable faulty part quantity is more than one, outputting all of the component parts that have the faulty count of non-zero.

* * * * *